United States Patent [19]

Switzer

[11] 4,210,065
[45] Jul. 1, 1980

[54] VALVE FOR CONTROLLING A FLUID PRESSURE OPERATED DEVICE

[76] Inventor: Ralph E. Switzer, 44 E. Roanoke #8, Phoenix, Ariz. 85004

[21] Appl. No.: 946,381

[22] Filed: Sep. 27, 1978

[51] Int. Cl.² .............................................. F15B 13/04
[52] U.S. Cl. .................................... 91/469; 100/250; 100/269 R; 100/DIG. 2; 137/625.68
[58] Field of Search ................................. 91/418, 469; 100/DIG. 2, 250; 137/625.68; 251/24

[56] References Cited
U.S. PATENT DOCUMENTS

| | | | |
|---|---|---|---|
| 2,417,994 | 3/1947 | Sheets | 251/24 |
| 2,916,985 | 12/1959 | Beach | 100/DIG. 2 |
| 3,024,720 | 3/1962 | Welsh | 100/DIG. 2 |
| 4,027,584 | 6/1977 | Sly | 100/250 X |

Primary Examiner—Gerald A. Michalsky
Attorney, Agent, or Firm—Herbert E. Haynes, Jr.

[57] ABSTRACT

A two position slide valve has an inlet port connected to a source of fluid under pressure and is configured so that in one position it will load the fluid into a pressure operated device and in the other position it will evacuate the loaded fluid from the device by passing the fluid from the source through a venturi which reduces the static pressure at the outlet port of the valve.

10 Claims, 5 Drawing Figures

VALVE FOR CONTROLLING A FLUID PRESSURE OPERATED DEVICE

BACKGROUND OF THE INVENTION

1. Field of the Invention

This invention relates to valves and more particularly to a two position valve for loading and unloading of a fluid pressure operated device.

2. Description of the Prior Art

Linear motion devices have long been known and employed for accomplishing various tasks such as: tool positioning, actuating control mechanisms, exerting compressive forces, and the like, with such devices most often being hydraulically, pneumatically, or electrically operated.

All such hydraulically, pneumatically, or electrically operated linear motion devices require the use of relatively elaborate operating equipment which, in addition to being complex, is expensive with regard to initial purchase, maintenance, and the consumption of energy.

To illustrate this point, consider that hydraulically operated linear motion devices normally include a hydraulic oil reservoir, and engine driven pump, flow switching valves, and a relatively elaborate plumbing system. Pneumatically operated linear motion devices normally include an engine, or motor driven compressor, a compressed air tank, suitable plumbing and switching valves. Electrically operated linear motion devices employ a reversible electric motor, devices for changing rotary motion to linear motion, and suitable motor reversing controls.

In many instances it would be desirable to employ a linear motion device, however, the initial cost, maintenance, and operating costs of the above described prior art devices are prohibitive, thus in such instances the tasks are either accomplished by hand or left entirely undone.

For example, in places where a relatively large number of canned foods or beverages are consumed, such as restaurants, taverns, domestic kitchens, and the like, it would be desirable to employ a linear motion device for crushing the empty cans to reduce the volume of refuse which must be handled and to facilitate reclamation of the cans. In such locations where the accomplishment of this and other similar tasks with a linear motion device would be desirable, a readily available, low cost course of power already exists; namely, municipal water pressure.

SUMMARY OF THE INVENTION

In accordance with the present invention a new and useful two position slide valve is disclosed for loading fluid under pressure into a pressure operated device to cause the device to accomplish a task, and subsequently unloading or evacuating the loaded fluid from the device. The valve is provided with an inlet port that is connected to a suitable source of fluid under pressure, such as a municipal water supply, and an outlet port which is connected to a return line, if the system is of the closed loop type, or otherwise, to a dumping line such as a sewer pipe. In addition to the inlet and outlet ports, the valve of the present invention is provided with a working port that is connected to the pressure operated device.

In a first, or loading position of the valve, fluid under pressure will flow from the inlet port into the body of the valve and out through the working port to the pressure operated device. When the task of the pressure operated device is completed, the valve is moved to its second, or evacuating position. In the evacuating position, fluid under pressure will flow from the inlet port into a passage formed in the slide pin of the valve, and exits through a venturi located in the oulet port of the valve. Such a flow will reduce the static pressure in the valve body and will cause the loaded fluid in the pressure operated device to flow back through the working port into the valve body and will exit therefrom through the outlet port.

The two position slide valve of the present invention may be employed for operating any suitable pressure operated device, and in the preferred embodiment is employed in combination with a crushing device for cans or other articles. Further, the valve may be actuated manually, or by any suitable actuating mechanism and may be connected to any suitable source of fluid under pressure such as a hydraulic oil line, compressed air line, or the above mentioned municipal water supply line.

Accordingly, it is an object of the present invention to provide a new and useful two position valve.

Another object of the present invention is to provide a new and useful two position valve for loading fluid under pressure into a pressure operated device and subsequently unloading the loaded fluid from the device.

Another object of the present invention is to provide a new and useful two position valve for connection to a readily available low cost source of power, and employing that power to operate a pressure operated device.

Another object of the present invention is to provide a new and useful two position valve of the above described character which is connected to a municipal water supply to utilize the pressure thereof for operation of a pressure operated device.

Still another object of the present invention is to provide a new and useful two position valve having an inlet port connectable to a source of fluid under pressure, an outlet port having a venturi therein, and a working port connectable to a pressure operated device, with the valve having a first position adapted to load the fluid under pressure into the pressure operated device, and a second position adapted to evacuate the loaded fluid from the device.

Yet another object of the present invention is to provide a new and useful two position valve of the above described character in combination with a pressure operated article crushing mechanism.

The foregoing and other objects of the present invention, as well as the invention itself, may be more fully understood from the following description when read in conjunction with the accompanying drawings.

DESCRIPTION OF THE PREFERRED EMBODIMENT

Figure 1:
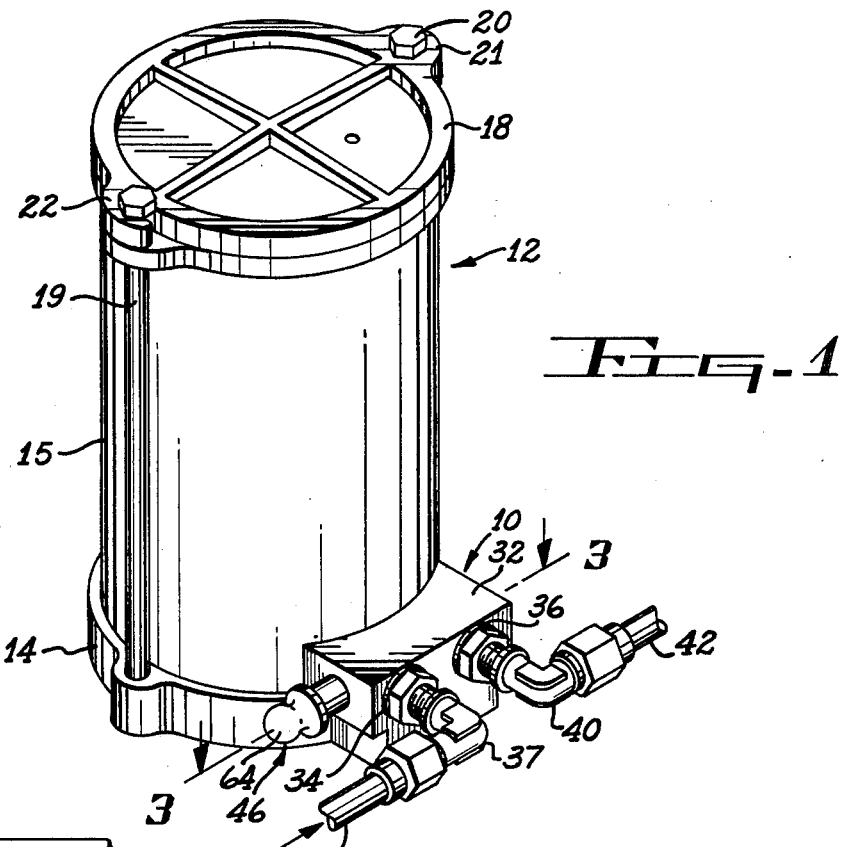
FIG. 1 is an isometric view showing the two position valve of the present invention as being employed in conjunction with a suitable article crushing mechanism.

Referring more particularly to the drawings, FIG. 1 illustrates the two position valve of the present invention, which is indicated in its entirety by the reference numeral 10, as being in combination with a pressure operated article crushing mechanism which is indicated generally by the reference numeral 12.

As will become apparent as this description progresses, the valve 10 may be employed in combination with any suitable pressure operated device, such as a materials dispensing device (not shown), a linear actuator (not shown), or the article crushing mechanism 12 which constitutes the preferred embodiment of the present invention.

Figure 2:
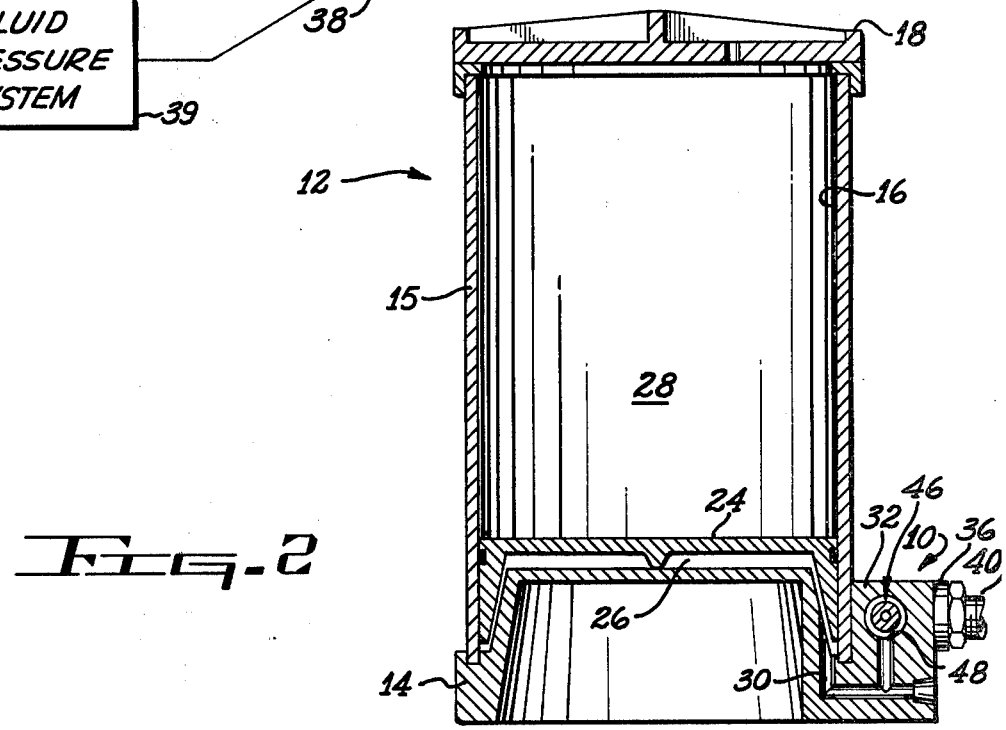
FIG. 2 is a vertical sectional view taken along the longitudinal axis of the article crushing mechanism shown in FIG. 1.

The article crushing mechanism 12, as best seen in FIG. 2, includes a base 14 upon which a cylindrical body 15 is fixedly mounted. The body 15 defines a cylindrical bore 16 which is closed at its bottom by virtue of the base 14, and is closed at its top by a swing lid 18. The article crushing mechanism 12 is provided with a pair of elongated bolts 19 and 20 which are both affixed at their lower ends to the base 14, and extend axially and upwardly alongside the body 15 on diametrically opposed sides thereof. The swing lid 18 has an ear 21 formed on one side thereof through which the bolt 20 passes, with the lid being pivotably movable about the longitudinal axis of that bolt 20. A radially extending hook element 22 is formed on the diametrically opposed side of the lid 18, with the hook being adapted for engaging the bolt 19 when the lid is pivotably swung to the closed position shown best in FIG. 1.

A piston 24 is freely reciprocally mounted in the cylindrical bore 16 of the mechanism 12, with the piston providing a movable partition in the bore to form a pressurization chamber 26 below the piston, and a working chamber 28 above the piston. As will hereinafter be described, the base 14 of the mechanism 12 has a passage 30 formed therein which communicates between the pressurization chamber 26 of the mechanism 12 and the two position valve 10.

Referring once again to FIG. 1 in particular, the two position valve 10 is seen to include a valve housing 32, which, in the illustrated embodiment is shown as being integral with the base 14 of the article crushing mechanism 12, but can obviously be a separate housing which is assembled thereto. In either case, the housing 32 has an inlet port 34 and a spaced outlet port 36. The inlet port 34 has a suitable fitting 37, such as an elbow, threadingly mounted therein with the elbow 37 being connected to a fluid input conduit 38. The fluid input conduit 38 is coupled to a suitable source 39 of fluid under pressure, such as a hydraulic oil system, compressed air system, or municipal water system. The outlet port 36 of the housing 32 is similarly provided with fitting means 40 to which a fluid outlet conduit 42 is connected. The outlet conduit 42 may be in the form of a fluid return line if the system (not shown) to which the valve is connected, is of the closed loop type or alternately, the outlet conduit may simply be a fluid dump line.

Figure 3:
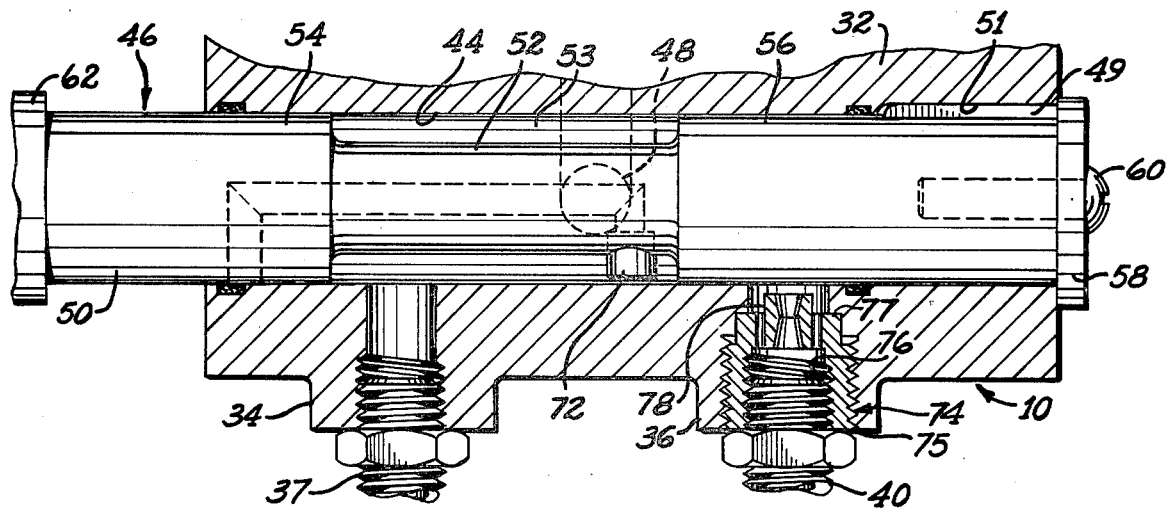
FIG. 3 is an enlarged fragmentary sectional view taken on the line 3—3 of FIG. 1 and showing the two position valve of the present invention in a first position thereof.
Figure 4:
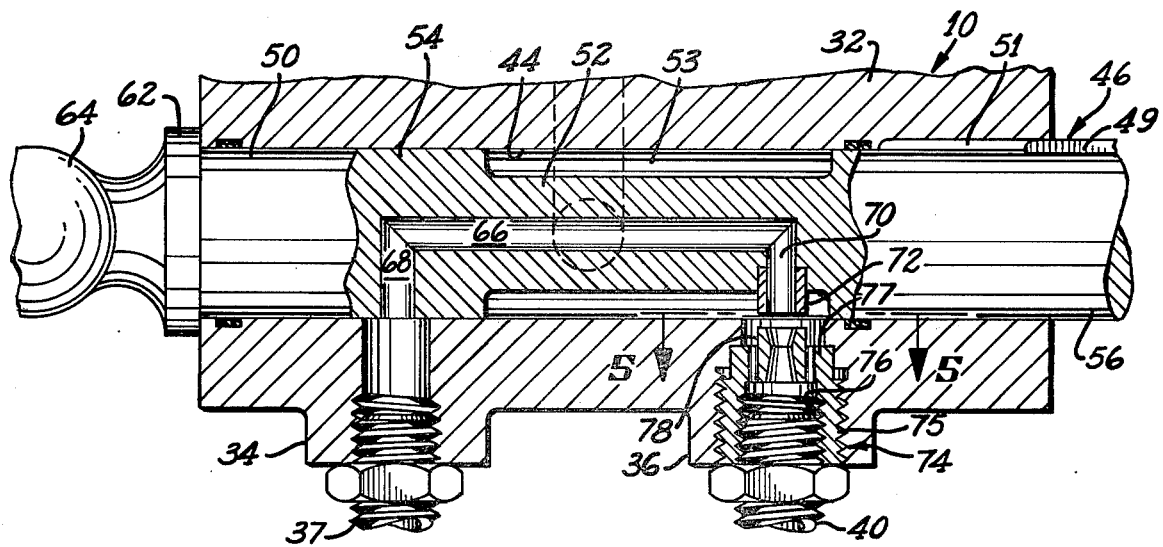
FIG. 4 is a sectional view similar to FIG. 3 but showing the valve of the present invention in a second position thereof.

The housing 32 of the two position valve 10, as shown in FIGS. 3 and 4, is provided with an elongated bore 44 formed therethrough in which an especially configured slide pin 46 is reciprocally slidable as will hereinafter be described in detail.

The bore 44 is disposed in the housing 32 so that the inlet port 34 and the outlet port 36 both open into the bore at spaced apart locations and extend radially therefrom. In addition to the inlet and outlet ports 34 and 36, the housing 32 is also provided with a radially disposed working port 48 (FIG. 2) which opens into the bore 44 thereof at a location intermediate the inlet and outlet ports, and is in communication with the passage 30 of the article crushing mechanism 12.

The slide pin 46 includes an elongated cylindrical pin body 50 having an intermediate stem portion 52 of reduced diameter which extends between and interconnects an oppositely disposed pair of land portions 54 and 56. The diameter of the land portions 54 and 56 of the pin body 50 closely match the diameter of the elongated cylindrical bore 44 formed through the valve housing 32 so that the body may be slidably reciprocally moved in that bore 44 from a first, or fluid loading position shown in FIG. 3, to a second or fluid unloading position shown in FIG. 4. The pin body 50 is provided with a key 49 which extends radially from the land portion 56 and extends longitudinally thereof. The key 49 is in slidingly registered engagement with a keyway 51 formed in the valve housing 32 so that axial rotation of the pin body 50 in the bore 44 is prevented.

In view of the bore 44 formed through the valve housing 32, and the reduced diameter of the stem portion 52 of the pin body 50, an annular fluid passage 53 is formed in the bore 44 of the valve housing 32. The fluid chamber 53 is defined on its opposite ends by the land portions 54 and 56 and is enclosed by the bore 44 of the valve housing 32.

Sliding movement of the slide pin 46 to its first position, left in FIG. 3, is limited by an enlarged plate 58 which is affixed, such as with a suitable screw 60, to the free end of the land portion 56 of the pin body 50. When the slide pin 46 is slidably moved to its first position, the plate 58 will move into abutting engagement with the valve housing 32 thus serving as a stop. The opposite end of the slide pin 46 has an enlarged plate 62 and a knob 64 formed integrally thereon with the plate 62 moving into abutting engagement with the opposite side of the valve housing 32 to serve as a stop when the pin is moved into its second position, i.e., to the right as in FIG. 4, and the knob 64 provides means for slidably moving the slide pin 46 in the bore 44.

As will hereinafter be described in detail, the slide pin 46 is provided with an axially disposed passage 66 having a fluid inlet branch passage 68 formed on one end thereof, and a fluid outlet passage 70 formed on the other end. The fluid inlet passage 68 extends normally from its respective end of the axial passage 66 and is disposed to open onto the peripheral surface of the land portion 54 of the pin body 50. The fluid outlet branch passage 70 extends normally from the opposite end of the axial passage 66 and is disposed to open into an extender sleeve 72 which is affixed to the stem portion 52 of the valve body 50, with the sleeve 72 extending radially from the stem 52 into close proximity with the bore 44 of the valve housing 32.

Figure 5:
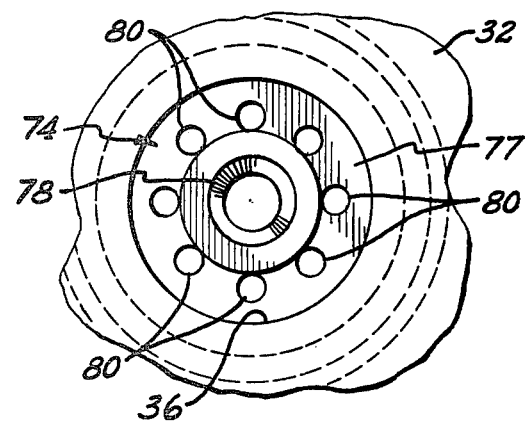
FIG. 5 is an enlarged fragmentary sectional view taken along the line 5—5 of FIG. 4.

As will hereinafter be described in detail, the outlet port 36 of the two position valve 10, as best seen in FIGS. 3, 4 and 5, has a venturi means 74 mounted therein which includes an externally threaded venturi housing 75 which is threaded into the outlet port 36. The venturi housing 75 has an internally threaded axial bore 76 formed in its outlet end, with the fitting means 40 in threaded engagement with the bore 76. The opposite, or inlet end of the venturi housing is provided with a plate 77 which lies in a plane transverse to the axis of the axial bore 76 and has an integral venturi nozzle 78 which is disposed so as to coaxially open into the bore 76 formed in the housing 75. As seen, the venturi nozzle 78 has a diameter which is somewhat smaller than the plate 77, and the plate has a plurality of apertures 80 formed therethrough so as to also extend into the bore 76 of the venturi housing 75. As will become apparent as this description progresses, the venturi means 74 configured as described above provides a venturi portion in the fluid outlet port 36 with that venturi portion circumscribed by a fluid evacuation portion.

Operation

When the slide pin 46 is moved into the first position thereof, as shown in FIG. 3, fluid under pressure from the input conduit 38 (FIG. 1) will pass through the inlet port 34 into the annular fluid chamber 53 provided in the housing 32. The fluid under pressure thus supplied to the fluid chamber 53 will flow through that chamber and exit therefrom through the working port 48. The fluid thus emerging from the fluid chamber 53 will flow through the passage 30 formed in the base 14 of the article crushing mechanism 12, and will enter into the pressurization chamber 26 to cause sliding movement of the piston 24 toward the top of the bore 16 of the mechanism. Thus the article crushing mechanism 12 will accomplish its intended task, i.e., the piston 24 will exert a compressive force which will crush a can (not shown) or other similar article located within the working chamber 28.

Upon completion of the above described task, the slide pin 46 is manually, or otherwise moved into its second position, which, as shown in FIG. 4, will relocate the annular fluid chamber 53 so that it is in communication with the working port 48 and the fluid outlet port 36 of the housing 32 and will align the fluid inlet branch passage 68 of the slide pin 46 with the inlet port 34 of the valve housing 32. In this second position, fluid under pressure entering the inlet port 34 will flow into the fluid passages 66, 68 and 70 formed through the slide pin 46, and will emerge therefrom through the extender sleeve 72. It will be noted that in the second position of the two position valve 10, the extender sleeve is disposed so as to be in spaced coaxial relationship with the inlet of the venturi nozzle 78, thus the fluid under pressure emerging from the sleeve 72 will flow through the venturi nozzle 78 into the bore 76 of the venturi housing 75 and will therefore exit the valve housing 32 through the fluid outlet conduit 42 (FIG. 1).

As is well known, fluid flowing through a venturi will increase in velocity and decrease in pressure. Thus, the above described fluid flow path which results when the slide pin 46 is in its second position, will cause a reduction of the static pressure proximate the venturi nozzle 78, with that reduced pressure being felt throughout the annular fluid chamber 53 formed in the valve housing 32. With such a reduction in the static pressure, the fluid in the annular chamber 53 will emerge therefrom through the apertures 80 formed in the venturi housing 75, and in doing so will cause the fluid previously loaded into the article crushing mechanism 12 to flow back through the passage 30 through the working port 48 into the annular chamber 53 and subsequently out of the two position valve 10 through the fluid outlet conduit 42.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A two position slide valve for handling a fluid under pressure comprising:
   (a) a housing having a bore formed therethrough with a fluid inlet port, a fluid outlet port and a working port communicating with that bore;
   (b) a venturi in the fluid outlet port of said housing, said venturi being of smaller diameter than the fluid outlet port to provide a venturi portion and an evacuation portion therein;
   (c) a slide pin axially movable in the bore of said housing and configured to provide a fluid chamber in that bore, said slide pin having a fluid passage formed therein;
   (d) said slide pin movable to a first position which locates the fluid chamber provided thereby in communication with the fluid inlet and the working ports of said housing so that when the fluid under pressure is supplied to the fluid inlet port of said housing that fluid will flow through the fluid chamber provided by said slide pin; and
   (e) said slide pin movable to a second position which locates the fluid chamber provided thereby in communcation with the working port and the fluid outlet port of said housing and locates the fluid passage of said slide pin so that it aligns with and extends between the fluid inlet and the fluid outlet ports of said housing so that when the fluid under pressure is supplied to the fluid inlet port of said housing that fluid will flow through the fluid passage of said slide pin and will flow through said venturi causing a reduction in static pressure proximate the fluid outlet port of said housing to evacuate the fluid chamber provided by said slide pin.

2. A two position slide valve as claimed in claim 1 wherein the fluid inlet port of said housing is adapted for connection to a source of liquid under pressure.

3. A two position slide valve as claimed in claim 1 wherein the working port of said housing is adapted for connection to a pressure operated device.

4. A two position slide valve as claimed in claim 1 wherein the fluid inlet port and the fluid outlet port of said housing are in spaced apart relationship with the working port of said housing located intermediate thereof.

5. A two position slide valve as claimed in claim 1 wherein said slide pin is formed with a land portion on each of its opposite ends with those land portions interconnected by a reduced diameter stem with the area between the land portions forming the fluid chamber in the bore of said housing.

6. A two position slide valve as claimed in claim 1 wherein said slide pin comprises:

(a) a body of cylindrical configuration having a pair of land portions which are spaced apart with the area therebetween forming the fluid chamber in the bore of said housing, said pair of land portions interconnected by a reduced diameter stem portion;

(b) said body having an axial passage formed therein with a fluid inlet branch passage extending normally from one end of said axial passage and opening onto the periphery of one of the land portions of said body and with a fluid outlet branch passage extending normally from the other end of said axial passage toward the periphery of the stem portion of said body;

(c) an extender sleeve mounted on the stem portion of said body and disposed to extend radially therefrom, said extender sleeve located so as to be in communication with said fluid outlet branch passage; and (d) said fluid inlet branch passage, said axial passage, said fluid outlet branch passage and said extender sleeve forming the fluid passage in said slide pin.

7. A two position slide valve as claimed in claim 1 wherein said venturi comprises:

(a) a venturi housing having an inlet end and an outlet end with an axial bore formed in the outlet end thereof;

(b) a plate on the inlet end of said venturi housing and disposed to lie in a plane transverse to the axis of the bore formed therein;

(c) a venturi nozzle located centrally of said plate and disposed to communicate between the inlet end of said venturi housing and the axial bore formed therein; and (d) said plate having a plurality of apertures formed therethrough with those apertures arranged about said venturi nozzle and disposed to communicate between the inlet end of said venturi housing and the axial bore formed therein.

8. In a combination of a pressure operated device and a two position slide valve comprising:

(a) a source of fluid under pressure;

(b) a pressure operated device; and (c) a two position slide valve connected to said source and to said pressure operated device, said slide valve comprising, I. a housing having a bore formed therethrough and having a fluid inlet port, a fluid outlet port and a working port all opening into that bore, the fluid inlet port being connected to said source and the working port being connected to said pressure operated device, II. a venturi in the fluid outlet port of said housing, said venturi smaller in diameter than the fluid outlet port to provide a venturi portion and an evacuation portion therein, III. a slide pin axially movable in the bore of said housing and configured to provide a fluid chamber in that bore, said slide pin having a fluid passage therein, IV. said slide pin movable to a first position which locates the fluid chamber formed thereby in communication with the fluid inlet port and the working port of said housing for directing fluid under pressure from said source through said housing to said pressure operated device, and V. said slide pin movable to a second position which locates the fluid chamber formed thereby in communication with the working port and the fluid outlet port of said housing and locates the fluid passage of said slide pin in alignment with and extending between the fluid inlet port and the fluid outlet port of said housing for directing fluid under pressure from said source through the fluid passage of said slide pin and through the venturi portion of said venturi to cause a reduction in static pressure proximate the evacuation portion of said venturi which results in a fluid flow from said pressure operated device through said housing and out through the fluid outlet port of said housing.

9. The combination of claim 8 wherein said source of fluid under pressure is a municipal water supply.

10. The combination of claim 8 wherein said pressure operated device is an article crushing mechanism.

* * * * *